Patented June 15, 1943

2,321,957

UNITED STATES PATENT OFFICE 2,321,957

PRODUCTION OF GOODS OF OR CONTAINING RUBBER OR SIMILAR MATERIAL

Douglas Frank Twiss, Sutton Coldfield, and Philip Harold Amphlett, Erdington, Birmingham, England, assignors to Dunlop Rubber Company Limited, London, England, a British company No Drawing. Application September 24, 1940, Serial No. 358,128. In Great Britain November 20, 1939

5 Claims. (Cl. 260—821)

This invention is concerned with improvements in the production of goods of or containing rubber or similar material from aqueous dispersions thereof by known operations such as mass moulding, dipping, spreading coating, extrusion and the like.

In the production of rubber articles from rubber latex coagulation is effected at some stage and the substances commonly employed for this purpose may be classified into: (a) acids or acidic substances or substances capable of giving rise to such acids or acidic substances; (b) salts of bi- or ter-valent metals. There are many industrial operations for the manufacture of rubber goods wherein coagulation is effected by substances in class a. Direct coagulation by acid takes place, for instance, in the formation of rubber articles by dipping a shaped former into latex with previous and/or subsequent immersion of the former into an acidic solution. In other industrial operations a delayed coagulation of the latex is effected by the addition of substances capable of the gradual generation of acids; persulphates and silicofluorides are substances of this class. An almost invariable ingredient of latex mixings is zinc oxide, added because of its value in the eventual step of vulcanisation. The presence of zinc oxide in latex mixings has however been found to have a deleterious effect on the type of coagulation induced by the presence of acid and this disadvantage is particularly evident in operations where coagulation is induced by means of a limited proportion of an acid or acid-generating substance. The phenomenon and the pH conditions which accompany its appearance are illustrated by comparing the behaviour of an alkali preserved commercial latex containing no zinc oxide and the same latex containing zinc oxide, when coagulation is induced by means of a measured proportion of sodium silicofluoride in each case. This comparison may be made by following the development of acidity and inception and progress of coagulation by repeated measurement of the pH value with a glass electrode and concurrent examination of the consistency of the latex or its coagulum. In the latex containing no zinc oxide coagulation is complete when a pH value of about 7 is reached. In the latex containing zinc oxide, on the other hand, the fall in pH, that is, the increase in acidity, is slower and coagulation takes place at a higher pH value. Moreover coagulation in the absence of zinc oxide begins in a shorter time, coagulation proceeds to completion more rapidly and also the pH of the aqueous medium falls more rapidly during the coagulation. The mechanical condition of the coagulum formed at the lower pH value and while the pH is still falling steadily is firmer and is more satisfactory than that obtained more slowly at an almost stationary and higher pH value, for the coagulum in this latter case tends to be weak or pasty. The impairment of the coagulation in the latex mixing containing zinc oxide is attributable to the dissolution of the zinc oxide, which accounts for the comparatively slow fall in pH and the comparatively high pH value when coagulation takes place.

It is the object of the present invention to decrease the solution of the zinc oxide when an aqueous dispersion of rubber containing zinc oxide is being coagulated by lowering the pH value and in this way avoid both the formation of weak coagula and the diminution in amount of zinc oxide available for any later vulcanisation of the rubber.

We have found that the decrease of the solubility and retardation of the rate of dissolution of the zinc oxide can be effected satisfactorily and in a convenient manner by the presence in the latex mixing of zinc ions other than those arising from the dissolution of the zinc oxide.

According to the present invention the process for the production of goods of or containing rubber or similar material from aqueous dispersions of rubber of the kinds hereinafter specified containing zinc oxide comprises incorporating in the dispersions without coagulation an ionisable zinc salt giving a greater concentration of zinc ions in water than zinc oxide gives in water, and coagulating the thus-treated dispersions by lowering the pH value.

As the electric potential at a zinc electrode placed in a solution of a zinc salt in water is an index of the concentration of zinc ions in the solution, the concentration of zinc ions in a solution of an ionisable zinc salt may be compared with the concentration of zinc ions in a saturated solution of zinc oxide in water by known electrochemical methods. The comparison may be made directly by measurement of the electromotive force in a circuit embracing two half-cells of a zinc or zinc amalgam electrode in an aqueous solution of the zinc salt under consideration and a zinc or zinc amalgam electrode in a saturated aqueous zinc oxide solution respectively. Alternatively, the potential of each of the said half-cells relatively to that of a practical standard such as one of the forms of the calomel electrode may first be measured. The preparation of zinc or zinc amalgam electrodes for use in such electrochemical determinations is discussed in a paper by W. J. Clayton and W. C. Vosburgh in the Journal of the American Chemical Society (1936), vol 58, page 2093 et seq.

The process of the present invention is of particular use in acid-coagulation operations wherein the fall in pH value takes place gradually, for example, in the setting of a latex mixing containing soap, zinc oxide and sodium silicofluoride the zinc salt incorporated being preferably one which is sparingly soluble in water and easily decomposed by acids. This type of salt decomposes progressively upon the addition or development of acid in the aqueous dispersion of rubber containing zinc oxide. Thus there are provided zinc ions in sufficient concentration to retard the dissolution of the zinc oxide and the diminution in the rate of increase of hydrogen ion concentration associated therewith. Examples of suitable sparingly-soluble, decomposable zinc salts include zinc ammonium phosphate and zinc sulphite. At 20° C. zinc sulphite is more effective than zinc ammonium phosphate; 0.08 gram of zinc sulphite per 100 grams of latex mixing has been found sufficient to give the improved coagulation.

The following example illustrates the effect of such an addition of zinc sulphite in narrowing the time interval during which coagulation is taking place, in lowering the pH value at which coagulation begins and in maintaining the fall in pH value of the serum even after coagulation is complete.

A latex mixing containing 100 parts by weight of rubber in the form of a latex of 60% total solids, 3 parts by weight of sulphur, 1 part by weight of an accelerator of vulcanisation and approximately 0.2 part by weight of ammonia was prepared. With one lot of 100 grams of this mixing were incorporated 1 gram of zinc oxide and 0.32 gram of sodium silicofluoride (mixing A); with another lot of 100 grams were incorporated 1 gram of zinc oxide, 0.32 gram of sodium silicofluoride and, in addition, 0.08 gram of zinc sulphite (mixing B). Measurements of the pH values of these mixings A and B were taken at intervals and the condition of each mixing observed, with the results tabulated below:

| Lapse of time in minutes | pH value of mixing A | pH value of mixing B |
| --- | --- | --- |
| 1 | 9.69 | 8.90 |
| 1.5 |  | 8.55 |
| 2 | 9.38 | 8.24 |
| 3 |  | 7.77 |
| 4 | 8.76 | 7.51 |
| 5 | 8.48 | 7.25 } Definite setting taking place. |
| 7 | 8.12 | 7.04 |
| 10 | 7.75 | 6.92 |
| 12 | 7.41 } Indefinite setting taking place. |  |
| 13 |  | 6.85 |
| 14 | 7.24 |  |
| 15 | 7.22 |  |

Zinc carbonate or the zinc salts which are well known as accelerators of vulcanisation, such as zinc diethyldithiocarbamate, zinc dibutyldithiocarbamate (butyl zimate) and zinc isopropyl xanthate, do not give a sufficiently high concentration of zinc ions in water to decrease the solubility of the zinc oxide or retard its rate of dissolution and consequently, when these substances are present in latex mixings containing zinc oxide, they are not effective in fulfilling the object of the present invention.

The aqueous dispersions comprise those containing rubber, gutta-percha, balata or similar vegetable resins occurring naturally or artificially obtained. Such artificial aqueous dispersions may include those of coagulated rubber, gutta-percha or balata, vulcanised rubber, synthetic rubber, isomerised rubber, or waste or reclaimed rubber. Vulcanised latices can also be employed. If desired, any of the aforementioned dispersions may be used alone or in admixture with one another. Any of the aforesaid dispersions may contain the usual known compounding ingredients and/or may be in concentrated form. Concentrates such as are obtained in British Patents Nos. 290,313 and 219,635 to which may be added any one or more of the usual compounding ingredients, may also be used. The aforementioned dispersions can be employed in the foamed condition; when they are to be foamed they are preferably treated with froth-forming or lather-forming substances such as soap or soap-forming ingredients. If desired the aqueous dispersions employed can be rendered capable of coagulating on the application of heat or in the cold after a definite and controllable time-interval by the addition of reagents which by chemical interaction or decomposition generate acid-reacting substances; ammonium persulphate, which gives rise to sulphuric acid on decomposition, is an example of such a reagent.

Goods produced according to the present invention have improved mechanical strength and uniformity of texture. Since the freshly coagulated rubber also has improved mechanical strength and uniformity of texture there is less risk of damage or permanent deformation during the handling and treatments necessary in the intermediate stages of manufacture.

What we claim is:

1. A process for the production of goods of rubber or similar material from aqueous dispersions thereof containing zinc oxide which comprises incorporating zinc sulphite in said dispersions without coagulation and coagulating the thus treated dispersions by lowering the pH value.

2. A process for the production of goods of rubber or similar material from aqueous dispersions thereof containing zinc oxide which comprises incorporating zinc sulphite in said dispersions without coagulation and coagulating the thus treated dispersions by lowering the pH value to about 7.25.

3. The process of claim 1 in which said pH value is reduced by adding to said dispersions an acid reacting agent.

4. A process for the production of goods of rubber or similar material from aqueous dispersions thereof which comprises incorporating in said dispersions without coagulation a zinc salt of the class consisting of zinc ammonium phosphate and zinc sulphite and coagulating the dispersions by lowering the pH value thereof.

5. A process for the production of goods of rubber or similar material from aqueous dispersions thereof containing zinc oxide which comprises incorporating zinc ammonium phosphate in said dispersions without coagulation and thereafter coagulating said dispersions.

DOUGLAS FRANK TWISS.
PHILIP HAROLD AMPHLETT.